US010317783B2

(12) United States Patent
Ogawa

(10) Patent No.: US 10,317,783 B2
(45) Date of Patent: Jun. 11, 2019

(54) LIGHT SOURCE UNIT AND PROJECTOR

(71) Applicant: CASIO COMPUTER CO., LTD., Tokyo (JP)

(72) Inventor: Masahiro Ogawa, Ome (JP)

(73) Assignee: CASIO COMPUTER CO., LTD, Tokyo (JP)

(*) Notice: Subject to any disclaimer, the term of this patent is extended or adjusted under 35 U.S.C. 154(b) by 0 days.

(21) Appl. No.: 15/979,159

(22) Filed: May 14, 2018

(65) Prior Publication Data

US 2018/0364554 A1 Dec. 20, 2018

(30) Foreign Application Priority Data

Jun. 20, 2017 (JP) .................. 2017-120162

(51) Int. Cl.
G03B 21/20 (2006.01)
G03B 21/28 (2006.01)
H04N 9/31 (2006.01)
G03B 21/16 (2006.01)
(Continued)

(52) U.S. Cl.
CPC ....... *G03B 21/2033* (2013.01); *G02B 26/008* (2013.01); *G02B 27/48* (2013.01);
(Continued)

(58) Field of Classification Search
CPC .. G03B 21/008; G03B 21/204; G03B 21/208; G03B 21/2013; G03B 21/2033;
(Continued)

(56) References Cited

U.S. PATENT DOCUMENTS

2009/0284148 A1* 11/2009 Iwanaga ............. G02B 26/008
313/506
2014/0078168 A1* 3/2014 Masuda .................. F21V 9/00
345/589
(Continued)

FOREIGN PATENT DOCUMENTS

JP 2012-008549 A 1/2012
JP 2013061525 A 4/2013
(Continued)

OTHER PUBLICATIONS

JPO; Application No. 2017-120162; Notification of Reasons for Refusal dated Apr. 11, 2019.

*Primary Examiner* — Sultan Chowdhury
(74) *Attorney, Agent, or Firm* — Fitch, Even, Tabin & Flannery LLP

(57) ABSTRACT

An embodiment provides a light source unit including an excitation light source for emitting excitation light, and a luminescent material wheel where a first area and a second area are disposed circumferentially, the first area having a first luminescent material layer for converting the excitation light into light of a first wavelength range, the second area having a second luminescent material layer for converting the excitation light into light of a second wavelength range adjoining the first wavelength range, wherein a reflecting portion to reflect the light of the first wavelength range is provided on an opposite side of the first luminescent material layer to a surface where the excitation light is shone, and wherein a transmitting portion for transmitting the light of the second wavelength range is provided on an opposite side of the second luminescent material layer to a surface where the excitation light is shone.

20 Claims, 7 Drawing Sheets

(51) Int. Cl.
*G03B 21/00* (2006.01)
*G02B 26/00* (2006.01)
*G02B 27/48* (2006.01)
*G03B 33/08* (2006.01)

(52) U.S. Cl.
CPC ........... *G03B 21/008* (2013.01); *G03B 21/16* (2013.01); *G03B 21/204* (2013.01); *G03B 21/28* (2013.01); *G03B 33/08* (2013.01); *H04N 9/312* (2013.01)

(58) Field of Classification Search
CPC .. G03B 21/2053; H04N 9/315; H04N 9/3114; H04N 9/3117; H04N 9/3161; H04N 9/3164; H04N 9/3182
See application file for complete search history.

(56) References Cited

U.S. PATENT DOCUMENTS

| | | | |
|---|---|---|---|
| 2015/0098065 A1* | 4/2015 | Tanaka | G03B 21/2013 353/84 |
| 2016/0150200 A1* | 5/2016 | Saka | G03B 21/005 353/31 |
| 2017/0237953 A1* | 8/2017 | Akiyama | H04N 9/3114 353/31 |

FOREIGN PATENT DOCUMENTS

| | | |
|---|---|---|
| JP | 2015-125214 A | 7/2015 |
| JP | 2015-143824 A | 8/2015 |
| JP | 2016-161709 A | 9/2016 |

* cited by examiner

LIGHT SOURCE UNIT AND PROJECTOR

CROSS-REFERENCE TO RELATED APPLICATION

This application is based upon and claims the benefit of priority under 35 USC 119 from Japanese Patent Application No. 2017-120162 filed on Jun. 20, 2017, the entire disclosure of which, including the description, claims, drawings and abstract, is incorporated herein by reference.

BACKGROUND OF THE INVENTION

Field of the Invention

The present invention relates to a light source unit and a projector including this light source unit.

Description of the Related Art

Data projectors are widely used on many occasions in these days as an image projection system for projecting a screen of a personal computer and a video screen, as well as images based on image data recorded on a memory card or the like. In these data projectors, light emitted from a light source is collected on to a micromirror display device called a digital micromirror device (DMD) or a liquid crystal panel to display a color image on a screen.

Conventionally, in the mainstream of these projectors, high-intensity discharge lamps have been used as a light source. In recent years, however, various types of projectors have been developed which use, as a light source, light emitting diodes, laser diodes, organic electroluminescence, or luminescent material.

For example, a light source diffuse wheel of a projector described in Japanese Unexamined Patent Publication No. 2013-61525 includes a first diffuse portion having a first diffuse angle and a second diffuse portion disposed radially outwards and inwards of the first diffuse portion. The second diffuse portion has a second diffuse angle that is smaller than the first diffuse angle. Adopting this configuration enables the light source diffuse wheel to suppress unevenness in luminance brightness and speckle noise.

In the projector described in Japanese Unexamined Patent Publication No. 2013-61525, to suppress speckle nose that is generated as a result of using a laser beam as blue light source light, the light source diffuse wheel includes the first diffuse portion and the second diffuse portion that have the different diffuse angles. However, the structure of the light source diffuse wheel is made complex by configuring the diffuse portions in the way described above.

SUMMARY OF THE INVENTION

The present invention has been made in view of the situations described above, and an object thereof is to provide a light source unit configured to reduce speckle noise and a projector using this light source unit.

According to an aspect of the invention, there is provided a light source unit including an excitation light source for emitting excitation light and a luminescent material wheel in which a first area and a second area are disposed in a circumferential direction, the first area having provided thereon a first luminescent material layer configured to convert the excitation light into light of a first wavelength range, the second area having provided thereon a second luminescent material layer configured to convert the excitation light into light of a second wavelength range that adjoins the first wavelength range, wherein a reflecting portion configured to reflect the light of the first wavelength range is provided on an opposite side of the first luminescent material layer to a surface thereof on to which the excitation light is shone, and wherein a transmitting portion configured to transmit the light of the second wavelength range is provided on an opposite side of the second luminescent material layer to a surface thereof on to which the excitation light is shone.

According to another aspect of the invention, there is provided a projector including the light source unit described above, a display device on to which light source light from the light source unit is shone and which forms image light, a projection side optical system configured to project the image light emitted from the display device on to a screen, and a control unit configured to control the display device and the light source unit.

DETAILED DESCRIPTION OF THE PREFERRED EMBODIMENTS

First Embodiment

Figure 1:
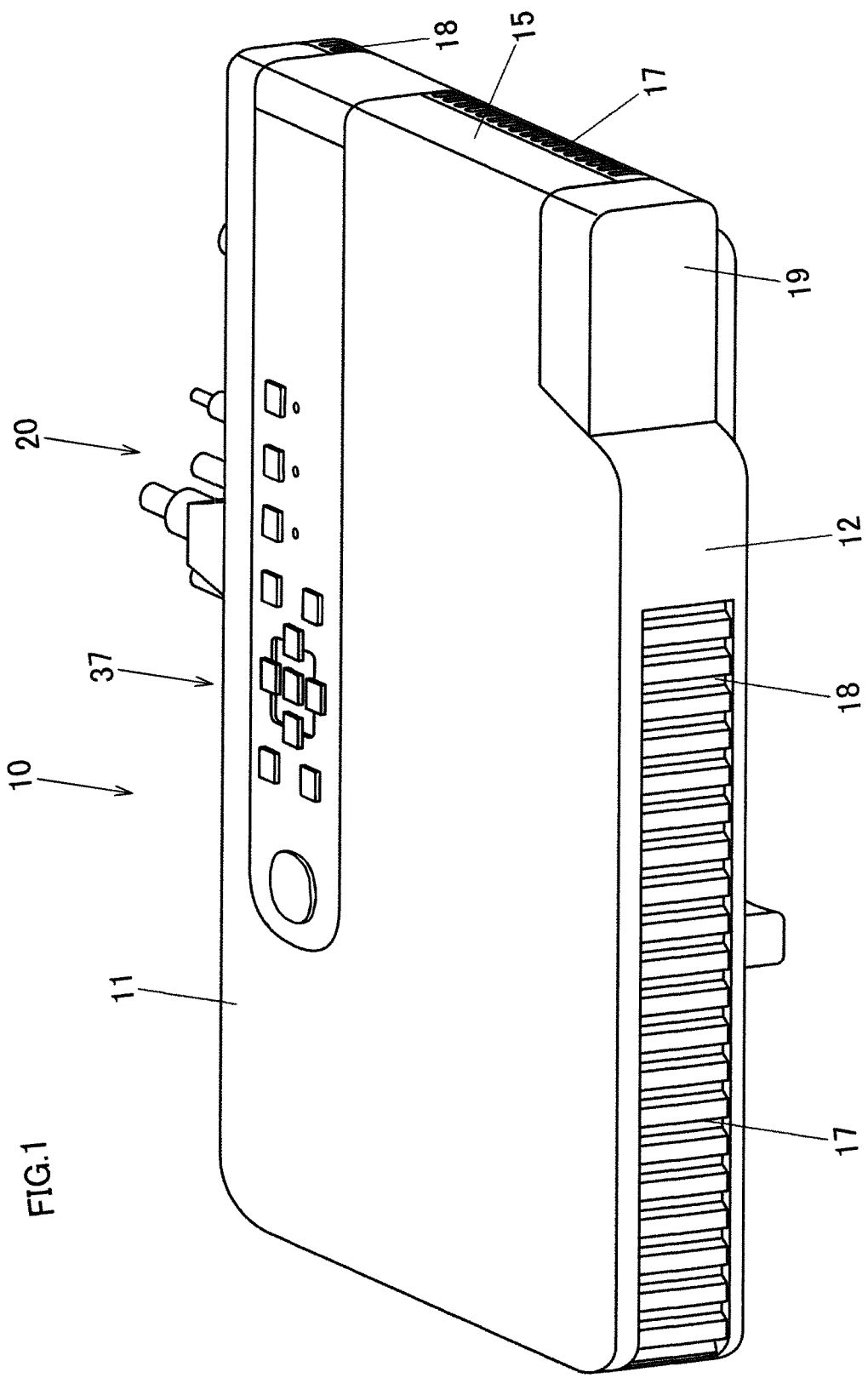
FIG. 1 is an external perspective view of a projector according to a first embodiment of the invention.

Hereinafter, a mode for carrying out the invention will be described. FIG. 1 is an external perspective view of a projector 10 according to a first embodiment. In the following description, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 has a substantially rectangular parallelepiped shape as shown in FIG. 1. The projector 10 has a lens cover 19 that covers a projection port to a side of a front panel 12 that is a front side panel of a casing of the projector 10. Pluralities of outside air inlet holes 18 and inside air outlet holes 17 are provided in the front panel 12. Further, although not shown, the projector 10 includes an Ir reception unit configured to receive a control signal from a remote controller.

A keys/indicators unit 37 is provided on an upper panel 11 of the casing. Disposed on this keys/indicators unit 37 are keys and indicators including a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat.

Further, various types of terminals 20 including an input/output connector unit, a power supply adaptor plug and the like are provided on a back panel of the casing. The input/output connector unit includes a USB terminal, a video signal input D-SUB terminal, an S terminal, an RCA terminal and the like. A plurality of outside air inlet holes are formed in the back panel. Additionally, a plurality of inside air outlet holes 17 are formed in each of a right panel, not shown, which is a side panel of the casing and a left panel 15, shown in FIG. 1, which is also a side panel of the casing. Further, outside air inlet holes 18 are formed in a corner portion of the left panel 15 that lies in the vicinity of the back panel.

Figure 2:
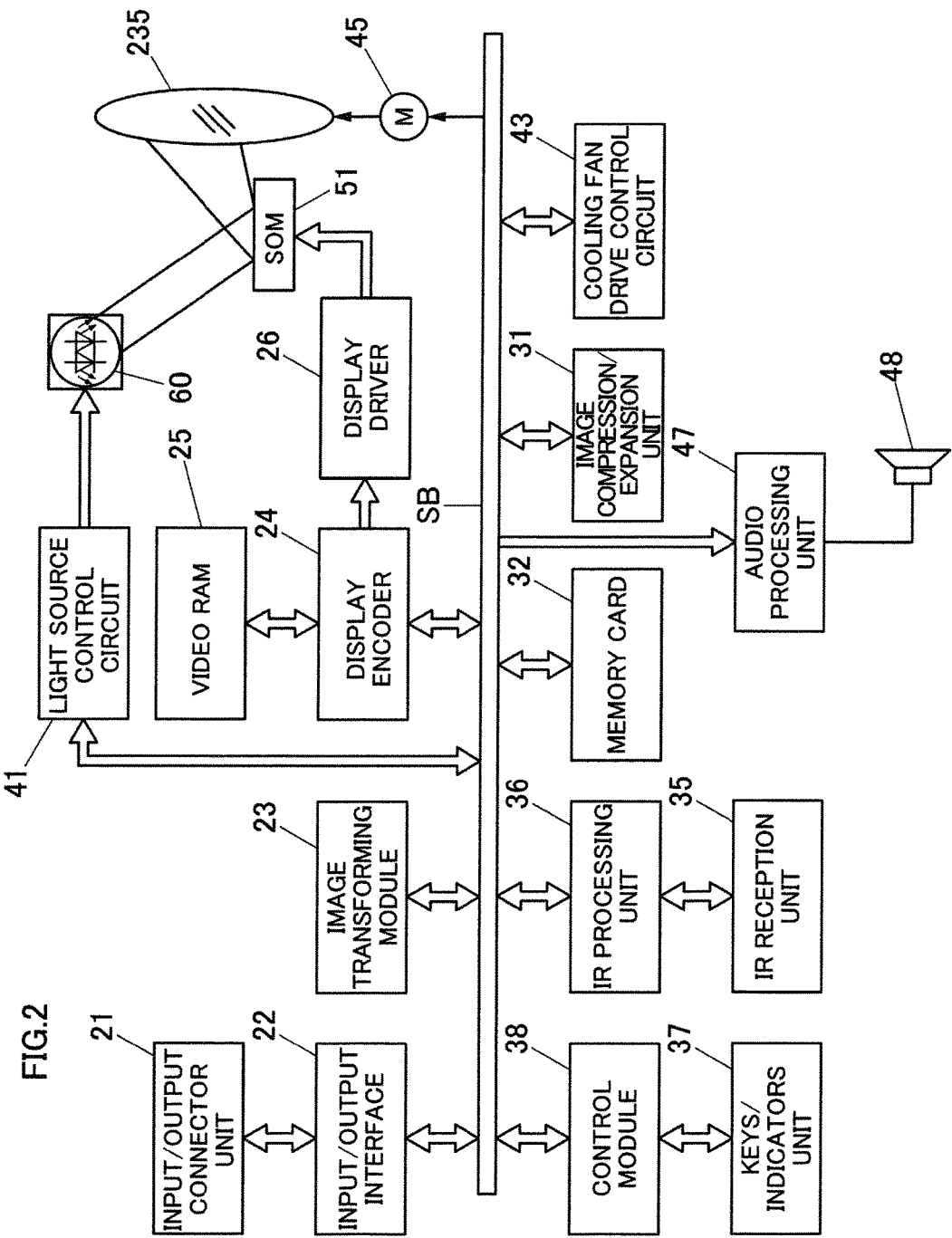
FIG. 2 is a block diagram illustrating functional circuit blocks of the projector according to the first embodiment of the invention.

Next, a projector control unit of the projector 10 will be described by the use of a functional circuit block diagram illustrated in FIG. 2. The projector control unit includes a control module 38, an input/output interface 22, an image transforming module 23, a display encoder 24, a display driver 26 and the like. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the unified image signal is outputted to the display encoder 24.

The display encoder 24 deploys the inputted image signal on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate in response to the image signal outputted from the display encoder 24. The projector 10 shines a pencil of light emitted from a light source unit 60 on to the display device 51 by way of a light guiding optical system, whereby an optical image is formed by using reflected light reflected by the display device 51. The image so formed is then projected on to a screen, not shown, for display thereon by way of a projection side optical system, which will be described later. A movable lens group 235 of the projection side optical system is driven by a lens motor 45 for zooming or focusing.

An image compression/expansion unit 31 performs a recording operation in which a luminance signal and a color difference signal of an image signal are data compressed through ADCT and Huffman coding processes, and the compressed data is sequentially written on a memory card 32 that constitutes a detachable recording medium. With the projector 10 set in a reproducing mode, the image compression/expansion unit 31 reads out the image data recorded on the memory card 32 and expands the individual image data that make up a series of dynamic images frame by frame. Then, the image compression/expansion unit 31 outputs the image data to the display encoder 24 by way of the image transforming module 23 so as to enable the display of dynamic images based on the image data stored on the memory card 32.

The control module 38 governs the control of respective operations of circuitries within the projector 10 and is made up of a CPU, a ROM that stores operation programs of various types of settings in a fixed fashion, a RAM that is used as a working memory and the like.

Operation signals generated at the keys/indicators unit 37 that includes the main keys and indicators that are provided on the upper panel 11 are sent out directly to the control module 38. Key operation signals from the remote controller are received by the IR reception unit 35 and are then demodulated into a code signal at an IR processing unit 36 for output to the control module 38.

The control module 38 is connected to an audio processing unit 47 by way of the system bus (SB). This audio processing module 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control module 38 controls a light source control circuit 41 that is configured as a light source control module. The light source control circuit 41 controls separately the operation of an excitation light shining device 70 (refer to FIG. 3) of the light source unit 60 so that light of a predetermined wavelength range that is required in forming an image is emitted from the light source unit 60. In addition, the light source control circuit 41 controls a timing at which a luminescent material wheel 101 or the like is synchronized based on an instruction from the control module 38 when the projector 10 is set in the projection mode.

Further, the control module 38 causes a cooling fan drive control circuit 43 to detect temperatures through a plurality of temperature sensors which are provided in the light source unit 60 so as to control the revolution speeds of cooling fans based on the results of the temperature detections. Additionally, the control module 38 also causes the cooling fan drive control circuit 43 to keep the cooling fans rotating by use of a timer or the like even after the power supply to a main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
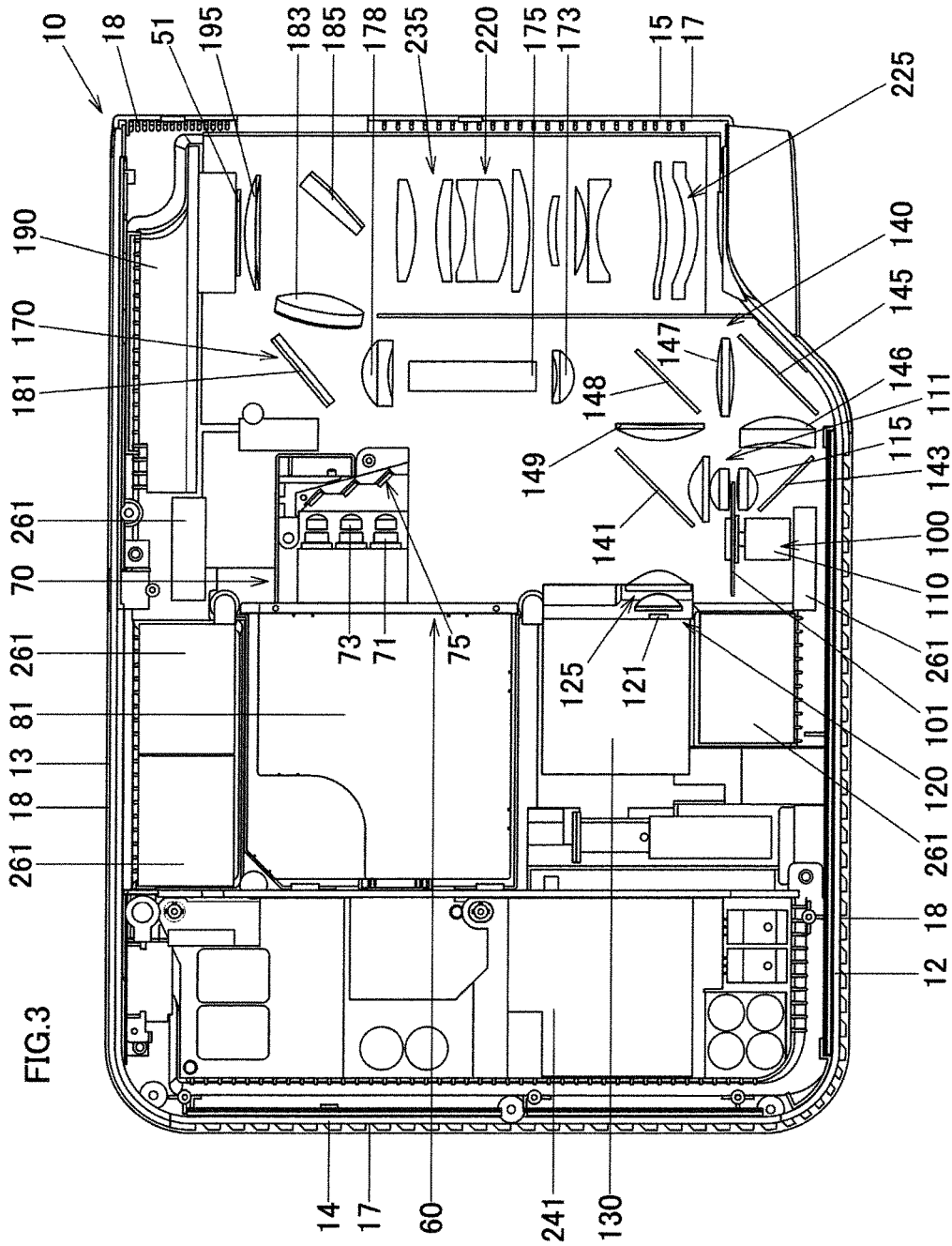
FIG. 3 is a schematic plan view illustrating an internal structure of the projector according to the first embodiment of the invention.

FIG. 3 is a schematic plan view illustrating an internal structure of the projector 10. The projector 10 includes a control circuit board 241 near the right panel 14. This control circuit board 241 includes a power supply circuit block and a light source control block. In addition, the projector 10 includes the light source unit 60 at a substantially central portion of the casing of the projector 10. Further, the projector 10 includes the light source side optical system 170 and a projection side optical system 220 that are disposed between the light source unit 60 and the left panel 15.

The light source unit 60 includes the excitation light shining device 70, a luminescent wheel device 100 which is a light source of light of a red wavelength range and light of a green wavelength range, and a blue light source device 120 which is a light source of light of a blue wavelength range. A light guiding optical system 140 is disposed in the light source unit 60. This light guiding optical system 140 guides and emits light of the red wavelength range, light of the green wavelength range and light of the blue wavelength range. The light guiding optical system 140 guides light of the red wavelength range, light of the green wavelength range and light of the blue wavelength range that are emitted from the light source devices (the luminescent wheel device 100 and the blue light source device 120) to the light source side optical system 170.

The excitation light shining device 70 is disposed at a substantially central portion of the casing of the projector 10 in relation to a left-and-right direction thereof and near the back panel 13. The excitation light shining device 70 includes a light source group (an excitation light source), a reflection mirror group 75 and a heat sink 81. The light source group includes blue laser diodes 71 which are a plurality of semiconductor light emitting elements. The blue laser diodes 71 are disposed so that their optical axes become parallel to the back panel 13. The reflection mirror group 75 turns an axis of light emitted from each of the blue laser diodes 71 through 90 degrees in the direction of the front panel 12. The heat sink 81 is disposed between the blue laser diodes 71 and the right panel 14.

The light source group is formed by arranging the plurality of blue laser diodes 71 into a matrix configuration. In an example of this embodiment, assuming that an up-and-down direction in FIG. 3 is referred to as a row and a vertical direction to a surface of a sheet of paper on which FIG. 3 is drawn is referred to as column, when seen from a side of the left panel 15, in total, six blue laser diodes 71 are arranged into a matrix configuration of two rows and three columns.

The collimator lenses 73 are disposed individually on the optical axes of the blue laser diodes 71. The collimator lenses 73 transform light of the blue wavelength range emitted from the blue laser diodes 71 into parallel light so as to enhance the directivity of the emitted light. The reflection mirror group 75 is formed by integrating a plurality of reflection mirrors which are arranged into a step-like configuration with a mirror base plate. The reflection mirror group 75 reduces pencils of light emitted from the blue laser diodes 71 in one direction to emit them to a first dichroic mirror 141.

A cooling fan 261 is disposed between the heat sink 81 and the back panel 13. The blue laser diodes 71 are cooled by the cooling fan 261 and the heat sink 81. A cooling fan 261 is disposed further between the reflection mirror group 75 and the back panel 13. This cooling fan 261 cools the reflection mirror group 75 and the like.

The luminescent wheel device 100 is disposed on an optical path of excitation light emitted from the excitation light shining device 70 and near the front panel 12. The luminescent wheel device 100 includes a luminescent material wheel 101, a motor 110, a collective lens group 111 and a collective lens 115.

The luminescent material plate 101 is disposed so as to be parallel to the front panel 12, that is, so as to intersect an axis of light emitted from the excitation light shining device 70 at right angles. The motor 110 drives the luminescent material plate 101 rotationally. The collective lens group 111 collects excitation light which is emitted from the excitation light shining device 70 on to the luminescent material plate 101 and also collects luminous light which is emitted from the luminescent material plate 101 in the direction of the back panel 13. The collective lens 115 collects luminous light which is emitted from the luminescent material plate 101 in the direction of the front panel 12. A cooling fan 261 is disposed at a front panel 12 side of the motor 110, so that the luminescent wheel device 100 and the like are cooled by this cooling fan 261.

Figure 4A:
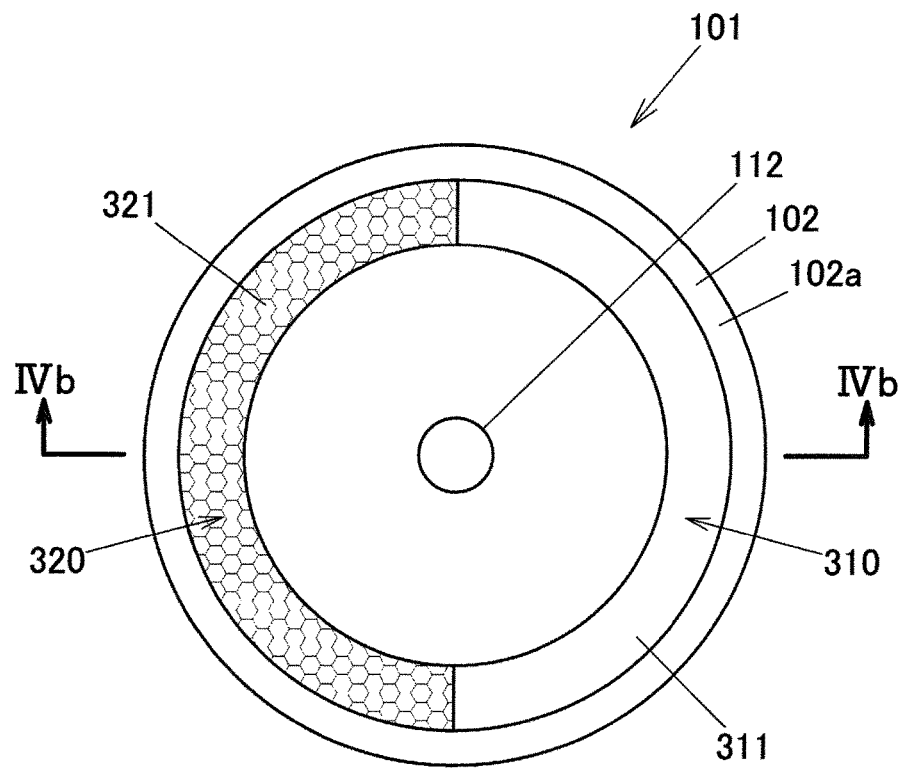
FIG. 4A is a schematic front view of a luminescent material wheel according to the first embodiment of the invention.
Figure 4B:
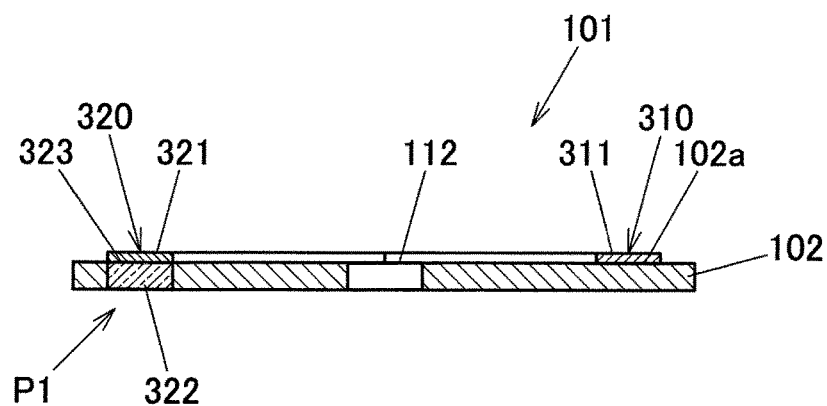
FIG. 4B is a schematic sectional view of the luminescent material wheel shown in FIG. 4A taken along a line IVb-IVb shown therein.

Here, the luminescent material wheel 101 will be described. FIG. 4A is a schematic front view of the luminescent material wheel 101 (as seen from a side where excitation light is incident in FIG. 3). FIG. 4B is a schematic sectional view of the luminescent material wheel 101 shown in FIG. 4A taken along a line IVb-IVb shown therein.

The luminescent material wheel 101 is formed into the shape of a substantially circular disc. A center shaft 112 of the luminescent material wheel 101 is fixed to a shaft portion of the motor 110 shown in FIG. 3. A base 102 of the luminescent material wheel 101 can be formed of metal such as copper, aluminum or the like. A surface of the base 102 which faces the excitation light shining device 70 is mirror finished through silver deposition or the like into a reflecting surface 102a. A first area 310 for emitting light of the green wavelength range and a second area 320 for emitting light of the red wavelength range are provided end to end in a circumferential direction near an outer circumferential edge of the luminescent material wheel 101 on the side thereof where excitation light is incident. The first area 310 has a first luminescent material layer 311 which is formed from a green luminescent material. The second area 320 has a second luminescent material layer 321 which is formed from a red luminescent material. The first area 310 and the second area 320 are each formed into the shape of a semi-arc.

The first luminescent material layer 311 is formed on the mirror finished reflecting surface 102 of the luminescent material wheel 101. A transmitting area 322 is formed on the base 102 in a position where the second area 320 is provided (refer to FIG. 4B). The transmitting area 322 is also formed into the shape of a semi-arc. The transmitting area 322 is formed, for example, by fitting a transparent base having a light transmitting characteristic in a cut-out portion formed in an outer circumferential edge portion of the base 102 of the luminescent material wheel 101. An anti-reflection (AR) filter 323 is formed on a front surface side of the transmitting area 322. In this embodiment, a transmitting portion P1 which transmits light of the red wavelength range (light of a second wavelength range) is formed on an opposite side of the second luminescent material layer 321 to a surface thereof on to which excitation light is shone. The transmitting portion P1 includes the transmitting area 322 and a space where a member such as the luminescent material wheel 101 or the like is not disposed.

The first luminescent material layer 311 emits light of the green wavelength range (light of a first wavelength range) as luminous light when light of the blue wavelength range emitted from the excitation shining device 70 is shone on thereto. The second luminescent material layer 321 emits light of the red wavelength range (light of the second wavelength range) which adjoins the green wavelength range as luminous light when light of the blue wavelength range emitted from the excitation light shining device 70 is shone on thereto. The transmitting area 322 transmits diffuse light which is produced luminescently in the second luminescent material layer 321 from a front side to a rear side of the luminescent material wheel 101.

Returning to FIG. 3, the blue light source device 120 includes a blue light source 121 and a collective lens group 125. The blue light source 121 is disposed so that its optical axis becomes parallel to the blue laser diodes 71. The collective lens group 125 collects light emitted from the blue light source 121. The blue light source 121 is a light emitting diode which is a semiconductor light emitting element. The blue light source 121 emits light of the blue wavelength range (light of a third wavelength range). Then, the blue light source device 120 is disposed so that an axis of light of the blue wavelength range emitted from the blue light source device 120 intersects an axis of light of the green wavelength range emitted from the luminescent material wheel 101. The blue light source device 120 also includes a heat sink 130 which is disposed at a right panel 14 side of the blue light source 121. A cooling fan 261 is disposed between the heat sink 130 and the front panel 12. Thus, the blue light source 121 is cooled by the cooling fan 261 and the heat sink 130.

The light guiding optical system 140 includes dichroic mirrors (the first dichroic mirror 141, a second dichroic mirror 143, a third dichroic mirror 148), a reflection mirror 145 for turning axes of pencils of light of the red, green and blue wavelength ranges so as to align them in the same direction, collective lenses 146, 147, 149 for collecting pencils of light of the red wavelength range, green wavelength range and blue wavelength range, and the like. Hereinafter, these constituent members will be described.

Figure 5:
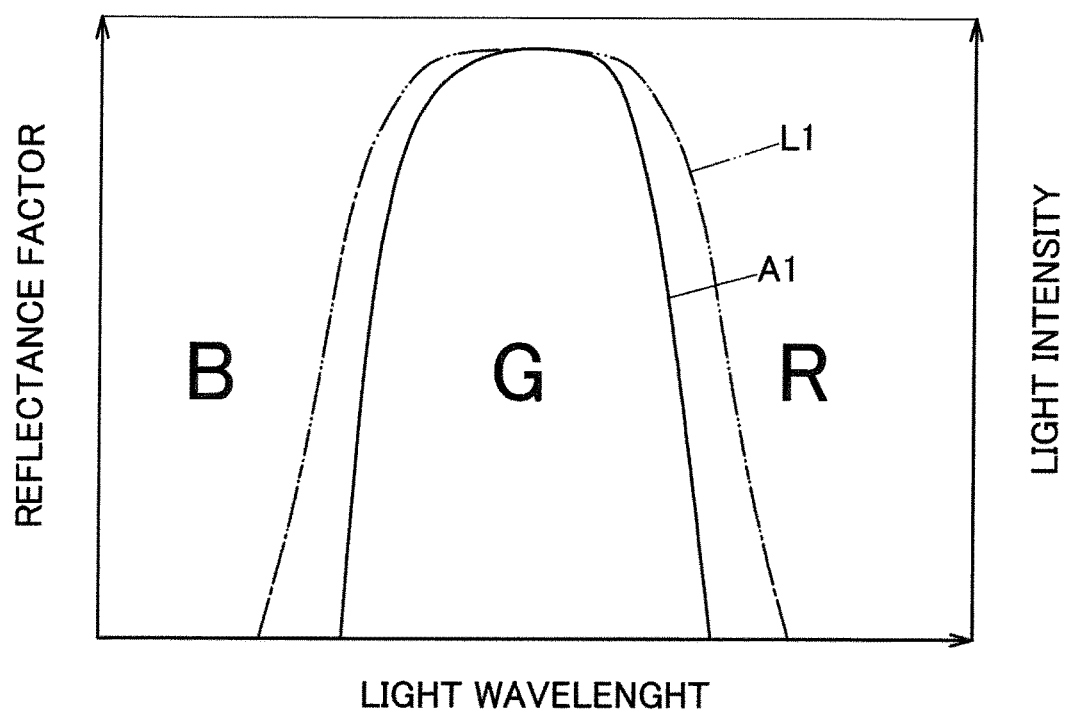
FIG. 5 is a diagram illustrating a reflection characteristic of a first dichroic mirror according to the first embodiment of the invention.

The first dichroic mirror 141 is disposed between the reflection mirror group 75 and the collective lens group 111. FIG. 5 shows a distribution curve of luminous light L1 of the green wavelength range emitted from the first luminescent material layer 311 of the luminescent material wheel 101 and a reflection characteristic A1 of the first dichroic mirror 141. "B" denotes the blue wavelength range, "G" denotes the green wavelength range, and "R" denotes the red wavelength range. The distribution curve of the luminous light L1 of the green wavelength range will be described. In FIG. 5, a right-hand side axis of ordinates denotes light intensity, and an axis of abscissas denotes light wavelength. Next, the reflection characteristic A1 of the first dichroic mirror 141 will be described. In FIG. 5, a left-hand side axis of ordinates denotes reflectance factor, the axis of abscissas denotes light wavelength.

As the reflection characteristic A1 shows, the first dichroic mirror 141 reflects mainly light of the green wavelength range and passes through light of the blue wavelength range and light of the red wavelength range. The first dichroic mirror 141 reflects light of almost all wavelength ranges in wavelength components of the luminous light L1 of the green wavelength range and guides it to the collective lens 149 shown in FIG. 3. The first dichroic mirror 141 in FIG. 3 transmits light of the blue wavelength range which is situated on a short wavelength side and part of light of the red wavelength range which is situated on a long wavelength side in the wavelength components of the luminous light L1 of the green wavelength range. Thus, light of the green wavelength range reflected on the first dichroic mirror 141 is guided as light of a high color purity. Light of the blue wavelength range emitted from the blue light source 121 passes through the first dichroic mirror 141, and light of the green wavelength range emitted from the first luminescent material layer 311 is reflected on the first dichroic mirror 141, whereby the light of the blue wavelength range and the light of the green wavelength range are caused to travel on the same optical path towards the left panel 15.

Figure 6:
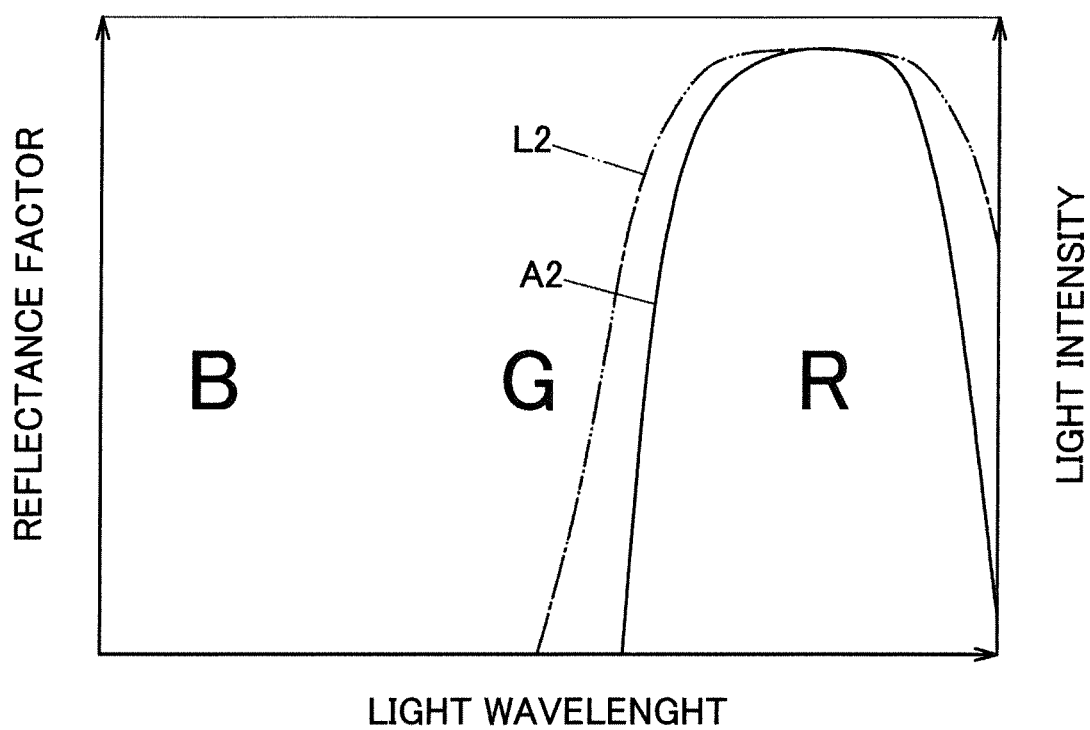
FIG. 6 is a diagram illustrating a reflection characteristic of a second dichroic mirror according to the first embodiment of the invention.

Returning to FIG. 3, the second dichroic mirror 143 is disposed on an axis of light of the red wavelength range emitted from the luminescent material wheel 101, that is, between the collective lens 115 and the front panel 13. Here, referring to FIG. 6, a reflection characteristic of the second dichroic mirror 143 will be described. In FIG. 6, a left-hand side axis of ordinates denotes reflectance factor, and an axis of abscissas denotes light wavelength. Similar to FIG. 5, in FIG. 6, too, "B" denotes light of the blue wavelength range, "G" denotes light of the green wavelength range, and "R" denotes light of the red wavelength range. FIG. 6 shows a distribution curve of luminous light L2 of the red wavelength range emitted from the second luminescent material layer 321 via the transmitting area 322. In FIG. 6, a right-hand side axis of ordinates denotes light intensity, and the axis of abscissas denotes light wavelength.

As the reflection characteristic A2 shows, the second dichroic mirror 143 reflects mainly light of the red wavelength range and passes through light of the blue wavelength range and light of the green wavelength range. The second dichroic mirror 143 reflects light of almost all wavelength ranges in wavelength components of the luminous light L2 of the red wavelength range and guides it to the collective lens 146 shown in FIG. 3. The second dichroic mirror 143 in FIG. 3 transmits light of the green wavelength range which is situated on a short wavelength side and part of light whose wavelength range is situated on a long wavelength side in the wavelength components of the luminous light L2 of the red wavelength range. Thus, light of the red wavelength range reflected on the second dichroic mirror 143 is guided as light of a high color purity. The second dichroic mirror 143 reflects light of the red wavelength range and turns an axis of the red light through 90 degrees towards the left panel 15. The collective lens 146 is disposed on a left panel 15 side of the second dichroic mirror 143. The reflection mirror 145 is disposed on a left panel 15 side of the collective lens 146. The reflection mirror 145 turns an axis of light of the red wavelength range which enters from the collective lens 146 through 90 degrees towards the back panel 13.

The collective lens 147 is disposed on a back panel 13 side of the reflection mirror 145. Additionally, the third dichroic mirror 148 is disposed on a left panel 15 side of the collective lens 149 and a back panel 13 side of the collective lens 147. The third dichroic mirror 148 reflects light of the green wavelength range and light of the blue wavelength range and transmits light of the red wavelength range.

Light of the red wavelength range collected by the collective lens 147 passes through the third dichroic mirror 148 and is then collected on to a collective lens 173 of the light source side optical system 170.

The collective lens 149 is disposed on a left panel 15 side of the first dichroic mirror 141. The light of the green wavelength range and the light of the blue wavelength range which are reflected by the first dichroic mirror 141 are guided to the collective lens 149. The light of the green wavelength range and the light of the blue wavelength range which are incident on and collected by the collective lens 149 are reflected by the third dichroic mirror 148 and are then collected on to the collective lens 173 of the light source side optical system 170. In this way, the light of the blue wavelength range, the light of the green wavelength range and the light of the red wavelength range are guided to the light source side optical system 170.

The light source side optical system 170 includes the collective lens 173, a light tunnel 175, a collective lens 178, a light axis turning mirror 181, a collective lens 183, a light shining mirror 185, a condenser lens 195 and the like. The condenser lens 195 emits image light emitted from the display device 51, which is disposed on a back panel 13 side of the condenser lens 195, towards the projection side optical system 220. Thus, the condenser lens 195 also makes up part of the projection side optical system 220.

The collective lens 173 is disposed near an incident port of the light tunnel 175 to collect light source light. Light of the red wavelength range, light of the green wavelength range and light of the blue wavelength range which are collected by the collective lens 173 are emitted towards the light tunnel 175.

The light axis turning mirror 181 is disposed at the rear of the collective lens 178 and on an optical axis of the light tunnel 175 directed towards the back panel 13. Pencils of light emerging from an emerging port of the light tunnel 175 are collected by the collective lens 178, and thereafter, axes of the pencils of light so collected are turned through 90 degrees towards the left panel 15 by the light axis turning mirror 181.

The pencils of light which are reflected by the light axis turning mirror 181 are collected by the collective lens 183 and are then shone on to the display device 51 via the condenser lens 195 at a predetermined angle by the light shining mirror 185. In this embodiment, a DMD is used as the display device 51. The display device 51 is cooled by a heat sink 190 which is provided on a back panel 13 side thereof.

The pencils of light, which are light source light, shone on to an image forming surface of the display device 51 by the light source side optical system 170 are reflected on the image forming surface of the display device 51 and are then projected on to a screen byway of the projection side optical system 220 as projected light. Here, the projection side optical system 220 includes the condenser lens 195, the movable lens group 235, a fixed lens group 225 and the like. The movable lens group 235 can be moved by the lens motor. Then, the movable lens group 235 and the fixed lens group 225 are incorporated in a fixed lens barrel. Thus, the fixed lens barrel including the movable lens group 235 is forms as a variable-focus lens which enables zooming and focusing.

With the projector 10 configured in the way described heretofore, when the luminescent material wheel 101 is rotated and light is emitted from the excitation light shining device 70 and the blue light source device 120 at required timings, light of the blue wavelength range, light of the green wavelength range and light of the red wavelength range are incident on the display device 51 by way of the light guiding optical system 140 and the light source side optical system 170. Due to this, the DMD or the display device 51 of the projector 10 displays blue, green and red light in a time-sharing fashion in accordance with data, thereby making it possible to project a color image on to the screen.

Second Embodiment

Figure 7A:
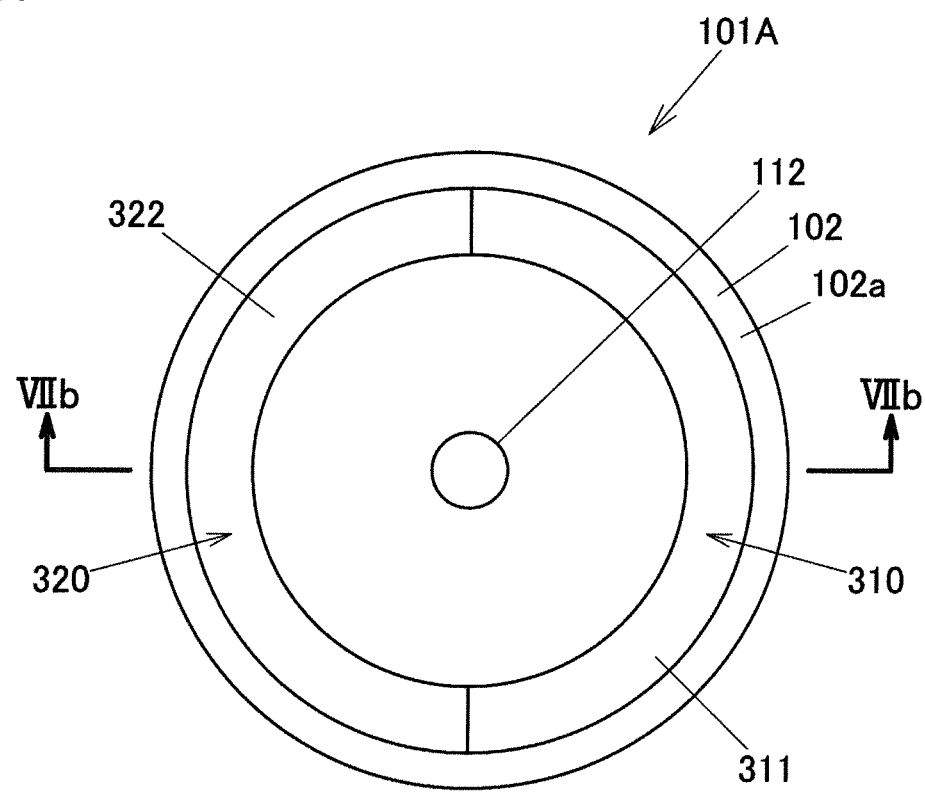
FIG. 7A is a schematic front view of a luminescent material wheel according to a second embodiment of the invention.
Figure 7B:
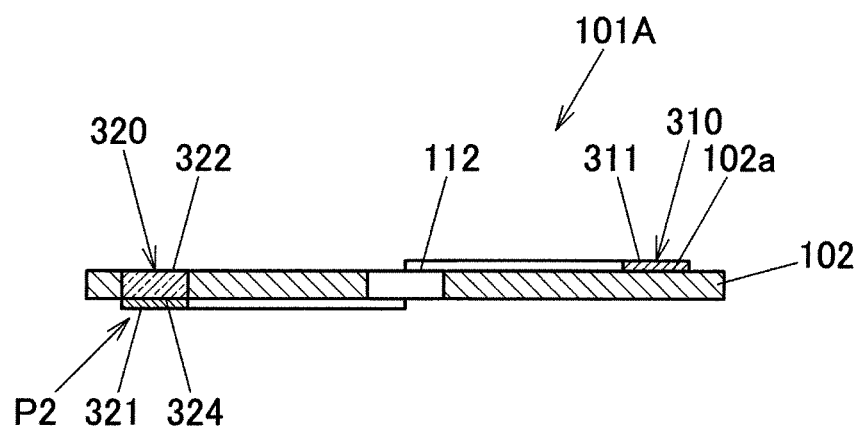
FIG. 7B is a schematic sectional view of the luminescent material wheel shown in FIG. 7A taken along a line VIIb-VIIb shown therein.

Next, a second embodiment will be described. In this embodiment, a luminescent material wheel 101A is used in place of the luminescent material wheel 101 of the first embodiment. FIG. 7A is a schematic front view of the luminescent material wheel 101A (as seen from a side where excitation light is incident in FIG. 3) according to the second embodiment of the invention. FIG. 7B is a schematic sectional view of the luminescent material wheel 101A shown in FIG. 7A taken along a line VIIb-VIIb shown therein. In describing the luminescent material wheel 101A, like reference numerals are given to like configurations to those of the luminescent material wheel 101 of the first embodiment, and the description thereof will be omitted or simplified.

The luminescent material wheel 101A is formed into the shape of a substantially circular disc as with the luminescent material wheel 101. A base 102 of the luminescent material wheel 101A can be formed of metal such as copper, aluminum or the like. A surface of the base 102 which faces an excitation light shining device 70 is mirror finished through silver deposition or the like into a reflecting surface 102a.

In this embodiment, a first luminescent material layer 311 of a first area 310 is formed on a side of the luminescent material wheel 101 on which excitation is incident, while a second luminescent material layer 321 of a second area 320 is formed on a back side of the luminescent material wheel 101A, that is, a side of the luminescent material wheel 101A from which light of a second wavelength range emerges. A dichroic filter 324 is formed on a back side of a transmitting area 322. The dichroic filter 324 reflects luminous light emitted from the second luminescent material layer 321 and transmits excitation light. In this embodiment, the dichroic filter 324 reflects light of a red wavelength range and transmits light of a blue wavelength range. In this embodiment, a transmitting portion P2 configured to transmit light of a red wavelength range (light of a second wavelength range) is provided on an opposite side of the second luminescent material layer 321 to a surface thereof on to which excitation light is shone. The transmitting portion P2 includes a space where a member such as the luminescent material wheel 101A and the like are not provided.

When light of the blue wavelength range emitted from the excitation light shining device 70 is shone on thereto, the first luminescent material layer 311 emits light of the green wavelength range (light of a first wavelength range) as luminous light. In addition, the transmitting area 322 transmits excitation light emitted from blue laser diodes 71 from a front side to a rear side of the luminescent material wheel 101A. When the excitation light transmitted through the transmitting area 322 is shone on thereto, the second luminescent material layer 321 emits light of the red wavelength range (light of the second wavelength range) as luminous light. Most of this luminous light is emitted substantially in the same direction as that of the excitation light as diffuse light. Although part of the light of the red wavelength range is sometimes emitted towards the transmitting area 322, it is reflected by the dichroic filter 324. Thus, the light of the red wavelength range is emitted substantially in the same direction as that of the excitation light.

Light of the green wavelength range emitted from the first luminescent material layer 311 travels towards a first dichroic mirror 141 and is then guided in a similar way to that of the first embodiment. Light of the red wavelength range emitted from the second luminescent material layer 321 travels towards a second dichroic mirror 143 and is then guided in a similar way to that of the first embodiment.

In this embodiment, it is possible to reduce a risk of luminous light emitted from the second luminescent material layer 321 being emitted to the front side of the luminescent material wheel 101A, whereby the second luminescent material layer 321 can be used efficiently as light source light of a light source unit 60. A filter configured to transmit light of the red wavelength range (light of the second wavelength range) but to reflect blue light may be laminated between the transmitting area 322 formed in the second area 320 of the luminescent material wheel 101A and the second luminescent material layer 321 or on an opposite surface of the transmitting area 322 to the surface thereof where the second luminescent material layer 321 is provided. By adopting this configuration, some excitation light of blue excitation light which passes through the second luminescent material layer 321 without contributing to emission of luminous light which is light of the red wavelength range (light of the second wavelength range) is reflected by the filter to thereby be returned to the second luminescent material layer 321. This enables the excitation light which is reflected by the filter to return to the second luminescent material layer 321 to contribute to emission of light of the red wavelength range (light of the second wavelength range), thereby making it possible to enhance the conversion efficiency of luminous light.

Thus, as has been described heretofore, the light source unit 60 and the projector 10 having this light source unit 10 include the luminescent material wheel 101 or 101A in which the first area 310 having the first luminescent material layer 311 configured to convert excitation light into light of the first wavelength range and the second area 320 having the second luminescent material layer 321 configured to convert excitation light into light of the second wavelength range which adjoins the first wavelength range are disposed in the circumferential direction. Additionally, the reflecting portion configured to reflect light of the first wavelength range is provided on the opposite side of the first luminescent material layer 311 to the surface thereof on to which excitation light is shone, and the transmitting portion configured to transmit light of the second wavelength range is provided on the opposite side of the second luminescent material layer 321 to the surface thereof on to which excitation light is shone. Light of the first wavelength range and light of the second wavelength range are both luminous light, and therefore, diffuse light can be guided as light source light. Consequently, the speckle noise of an image projected on to the screen or the like can be reduced.

With the light source unit 60 in which of light of the first wavelength range and light of the second wavelength range, one is light of the red wavelength range, and the other is light of the green wavelength range, light of the red wavelength range and light of the green wavelength range which are emitted as diffuse light can be used as light source light. Thus, the light source unit 60 can reduce the speckle noise of a projected image.

With the light source unit 60 in which excitation light is light of the blue wavelength range, compared with outputting light on the short wavelength side such as ultraviolet ray, the first luminescent material layer 311 and the second luminescent material layer 321 can be excited even with low electric power.

With the light source unit 60 including the light emitting diode (the blue light source 121) configured to emit light of the blue wavelength range, it is possible to emit light source light of the blue wavelength range which makes the generation of speckle noise difficult.

With the light source unit 60 in which the excitation light source is made up of the laser diodes, it is possible to emit luminous light of high luminance brightness from the first luminescent material layer 311 and the second luminescent material layer 321.

With the light source unit 60 in which the second luminescent material layer 321 is provided on the side of the transmitting area 322 on which excitation light is incident and the anti-reflection filter 323 configured to prevent the reflection of light of the second wavelength range is formed on the transmitting area 322, the second luminescent material layer 321 and the first luminescent material layer 311 are formed on the same surface side of the base 102, whereby the luminescent material wheel 101 can easily be formed. Additionally, excitation light can be shone directly on to the second luminescent material layer 31, whereby luminous light can be excited efficiently.

With the light source unit 60 in which the second luminescent material layer 321 is provided on the emerging side of the transmitting area 322 from which light of the second wavelength range emerges and the dichroic filter 324 configured to transmit excitation light but to reflect light of the second wavelength range is formed on the transmitting area 322, luminous light excited by the second luminescent material layer 321 can be emitted efficiently in the same direction as the direction in which excitation light is emitted.

With the light source unit 60 including the first dichroic mirror 141 configured to transmit light of the predetermined wavelength range in light of the first wavelength range, light of the first wavelength range with the high color purity can be made use of as light source light.

With the light source unit 60 including the second dichroic mirror 143 configured to transmit light of the predetermined wavelength range in light of the second wavelength range, light of the second wavelength range with the high color purity can be made use of as light source light.

The embodiments that have been described heretofore are presented as examples, and hence, there is no intention to limit the scope of the invention by the embodiments. These novel embodiments can be carried out in other various forms, and various omissions, replacements and modifications can be made thereto without departing from the spirit and scope of the invention. The resulting embodiments and modifications are included in the spirit and scope of the invention and are also included in the scope of inventions described in claims and their equivalents.

For example, in the luminescent material wheel 101 shown in FIGS. 4A, 4B, the first luminescent material layer 311 may be a red luminescent material layer, while the second luminescent material layer 321 may be a green luminescent material layer. As this occurs, the first dichroic mirror 141 shown in FIG. 3 can be configured to reflect light of the red wavelength range but to transmit light of the blue wavelength range and light of the green wavelength range. In addition, the second dichroic mirror 143 can be configured to reflect light of the green wavelength range but to transmit light of the blue wavelength range and light of the red wavelength range. Further, the third dichroic mirror 148 can be configured to reflect light of the blue wavelength range and light of the red wavelength range but to transmit light of the green wavelength range.

A light source for emitting light of a short wavelength such as light of an ultraviolet wavelength range may be used in place of the blue laser diodes 71. This light source can use laser diodes or light emitting diodes.

What is claimed is:

1. A light source unit comprising:
an excitation light source for emitting excitation light; and
a luminescent material wheel in which a first area and a second area when viewed from a plan side are disposed at different positions relative to each other in a circumferential direction of the luminescent material wheel, the first area having provided thereon a first luminescent material layer configured to convert the excitation light into light of a first wavelength range, the second area having provided thereon a second luminescent material layer configured to convert the excitation light into light of a second wavelength range having a color different from that of the first wavelength range, wherein
a reflecting portion configured to reflect the light of the first wavelength range is provided on an opposite side of the first luminescent material layer to a surface thereof on to which the excitation light is shone, and wherein a transmitting portion configured to transmit the light of the second wavelength range is provided on an opposite side of the second luminescent material layer to a surface thereof on to which the excitation light is shone.

2. The light source unit according to claim 1, wherein one of the light of the first wavelength range and the light of the second wavelength range is light of a red wavelength range, and the other is light of a green wavelength range.

3. The light source unit according to claim 1, wherein the excitation light is light of a blue wavelength range.

4. The light source unit according to claim 2, wherein the excitation light is light of a blue wavelength range.

5. The light source unit according to claim 1, comprising:
a light emitting diode for emitting light of a blue wavelength range.

6. The light source unit according to claim 2, comprising:
a light emitting diode for emitting light of a blue wavelength range.

7. The light source unit according to claim 3, comprising:
a light emitting diode for emitting light of a blue wavelength range.

8. The light source unit according to claim 4, comprising:
a light emitting diode for emitting light of a blue wavelength range.

9. The light source unit according to claim 1, wherein the excitation light source is a laser diode.

10. The light source unit according to claim 2, wherein the excitation light source is a laser diode.

11. The light source unit according to claim 3, wherein the excitation light source is a laser diode.

12. The light source unit according to claim 4, wherein the excitation light source is a laser diode.

13. The light source unit according to claim 5, wherein the excitation light source is a laser diode.

14. The light source unit according to claim 6, wherein the excitation light source is a laser diode.

15. The light source unit according to claim 1, wherein the light of the first wavelength range is light of a green wavelength range, and the light of the second wavelength range is light of a red wavelength range.

16. The light source unit according to claim 1, comprising:
a first dichroic mirror configured to transmit light of a wavelength range situated on a long wavelength side in the light of the first wavelength range.

17. The light source unit according to claim 1, comprising:
a second dichroic mirror configured to transmit light of a wavelength range situated on a short wavelength side in the light of the second wavelength range.

18. A projector comprising:
the light source unit according to claim 1;
a display device on to which light source light from the light source unit is shone and which forms image light;
a projection side optical system configured to project the image light emitted from the display device on to a screen; and
a control unit configured to control the display device and the light source unit.

19. A light source unit comprising:
an excitation light source for emitting excitation light; and
a luminescent material wheel in which a first area and a second area are disposed in a circumferential direction, the first area having provided thereon a first luminescent material layer configured to convert the excitation light into light of a first wavelength range, the second area having provided thereon a second luminescent material layer configured to convert the excitation light into light of a second wavelength range that adjoins the first wavelength range, wherein a reflecting portion configured to reflect the light of the first wavelength range is provided on an opposite side of the first luminescent material layer to a surface thereof on to which the excitation light is shone, wherein a transmitting portion configured to transmit the light of the second wavelength range is provided on an opposite side of the second luminescent material layer to a surface thereof on to which the excitation light is shone, wherein the second luminescent material layer is provided on a side of a transmitting area on which the excitation light is incident, and wherein an anti-reflection filter configured to prevent a reflection of the light of the second wavelength range is formed on the transmitting area.

20. A light source unit comprising:
an excitation light source for emitting excitation light; and
a luminescent material wheel in which a first area and a second area are disposed in a circumferential direction, the first area having provided thereon a first luminescent material layer configured to convert the excitation light into light of a first wavelength range, the second area having provided thereon a second luminescent material layer configured to convert the excitation light into light of a second wavelength range that adjoins the first wavelength range, wherein a reflecting portion configured to reflect the light of the first wavelength range is provided on an opposite side of the first luminescent material layer to a surface thereof on to which the excitation light is shone, wherein a transmitting portion configured to transmit the light of the second wavelength range is provided on an opposite side of the second luminescent material layer to a surface thereof on to which the excitation light is shone, wherein the second luminescent material layer is provided on an emerging side of a transmitting area from which the light of the second wavelength range emerges, and wherein a dichroic filter configured to transmit the excitation light but to reflect the light of the second wavelength range is formed on the transmitting area.

* * * * *